(12) United States Patent
Levanoni et al.

(10) Patent No.: US 8,510,724 B2
(45) Date of Patent: Aug. 13, 2013

(54) RECONSTRUCTING PROGRAM CONTROL FLOW

(75) Inventors: Yosseff Levanoni, Redmond, WA (US); Weirong Zhu, Issaquah, WA (US); Lingli Zhang, Sammamish, WA (US); John Lee Rapp, Redmond, WA (US); Andrew L. Bliss, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 12/972,198

(22) Filed: Dec. 17, 2010

(65) Prior Publication Data

US 2012/0159458 A1 Jun. 21, 2012

(51) Int. Cl.
*G06F 9/45* (2006.01)

(52) U.S. Cl.
USPC ........... 717/136; 717/137; 717/140; 717/145; 717/146

(58) Field of Classification Search
None
See application file for complete search history.

(56) References Cited

U.S. PATENT DOCUMENTS

| | | | |
|---|---|---|---|
| 5,805,893 A * | 9/1998 | Sproul et al. | 717/137 |
| 5,850,550 A * | 12/1998 | Li et al. | 717/154 |
| 6,063,133 A * | 5/2000 | Li et al. | 717/136 |
| 6,381,739 B1 | 4/2002 | Breternitz | |
| 6,654,950 B1 * | 11/2003 | Barnishan | 717/136 |
| 7,086,039 B2 * | 8/2006 | Lam | 717/136 |
| 7,207,038 B2 | 4/2007 | Bicsak | |
| 7,293,261 B1 | 11/2007 | Anderson | |
| 7,366,914 B2 | 4/2008 | Graunke | |
| 7,568,189 B2 * | 7/2009 | Suba et al. | 717/145 |
| 7,992,139 B2 * | 8/2011 | Chitgupakar et al. | 717/136 |
| 8,332,828 B2 * | 12/2012 | Vargas | 717/137 |
| 2004/0103405 A1 * | 5/2004 | Vargas | 717/137 |
| 2004/0181785 A1 * | 9/2004 | Zwirner et al. | 717/140 |
| 2004/0268330 A1 * | 12/2004 | Grover et al. | 717/146 |
| 2008/0216060 A1 * | 9/2008 | Vargas | 717/137 |
| 2010/0131936 A1 | 5/2010 | Cheriton | |
| 2010/0257516 A1 | 10/2010 | Roediger | |
| 2011/0078653 A1 * | 3/2011 | Deneau | 717/106 |

OTHER PUBLICATIONS

Residual Test Coverage Monitoring et al., "Residual Test Coverage Monitoring" [Online], ACM 1999,pp. 277-284, [Retrieved from Internet on Apr. 10, 2013], <http://ieeexplore.ieee.org/stamp/stamp.jsp?tp=&arnumber=841018>.*

John Joseph Chilenski et al., "Applicability of modified conditiod-decision coverage to sofhmre testing", [Online], 1994, pp. 194-200, [Retrieved from Internet on Apr. 10, 2013], <http://core.ecu.edu/STRG/materials/Biblography%202.pdf>.*

(Continued)

*Primary Examiner* — Thuy Dao
*Assistant Examiner* — Ziaul A Chowdhury
(74) *Attorney, Agent, or Firm* — Workman Nydegger (57) ABSTRACT

The present invention extends to methods, systems, and computer program products for reconstructing program control flow. Embodiments include implementing or morphing a control flow graph ("CFG") into an arbitrary loop structure to reconstruct (preserve) control flow from original source code. Loop structures can be optimized and can adhere to target platform constraints. In some embodiments, C++ source code (a first higher level format) is translated into a CFG (a lower level format). The CFG is then translated into High Level Shader Language ("HLSL") source code (a second different higher level format) for subsequent compilation into SLSL bytecode (that can then be executed at a Graphical Processing Unit ("GPU")). The control flow from the C++ source code is preserved in the HLSL source code.

20 Claims, 4 Drawing Sheets

(56) References Cited

OTHER PUBLICATIONS

Kemal Ebcioglu et al., "Dynamic Binary Translation and Optimization", [Online], IEEE Jun. 2001, pp. 529-548, [Retrieved from Internet on Apr. 10, 2013], <http://ieeexplore.ieee.org/stamp/stamp.jsp?tp=&arnumber=931892>.*

Anton Chernoff et al., "A Profile-Directed Binary Translator", [Online], IEEE 1998, pp. 56-64, [Retrieved from Internet on Apr. 10, 2013], <ftp://ftp.cis.upenn.edu/pub/cis700-6/public_html/04f/papers/chernoff-fx32.pdf>.*

Shivers, Olin, "The Anatomy of a Loop", Sep. 28, 2005, 13 pages.

Author Unknown, "Analysis and Representation of Loops", Jul. 23, 2009, 10 pages.

* cited by examiner

RECONSTRUCTING PROGRAM CONTROL FLOW

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

To develop a software application for performing a computing task, a developer typically writes source code (e.g., in C++, Visual Basic, etc.) that expresses the desired functionality of the software application. The source code can then be compiled into executable code (or alternately interpreted at execution time). During source code compilation, a compiler converts source code instructions into machine instructions (e.g., x86 instructions) that are directly executable on a computer system. The executable code is run on a computer system to implement the desired functionality.

In some environments, a single stage compiler is used to compile source code into executable code. For example, a C++ compiler can compile C++ source code directly to executable code that can be run on a processor of a personal computer. In other environments, a multi-stage compiler is used to compile source code into executable code. A multi-stage compiler can include a number of different compilation stages. Each compilation stage can perform some translation, conversion, etc., to progress toward compiling received source code into machine instructions (e.g., targeted to a specific processor).

In further environments, source code can be translated between various different formats to facilitate subsequent compilation. For example, expressions and statements of a first higher level language can be translated into instructions in a lower-level intermediate representation ("IR"). Subsequently, the instructions in the lower-level intermediate format can be translated into expressions and statements of a second higher level language. The expressions and statements of a second higher level language can then be compiled. Translating between higher level languages permits a developer to develop code for a platform even when the developer has reduced knowledge about the platform.

Ideally, the program structure represented in the expressions and statements of the first higher level language is preserved in the expressions and statements of the second higher level language. However, when the second higher level language lacks flow control constructs equivalent to those of the lower-level intermediate format (e.g., conditional and/or unconditional branches), flow control information (a portion of program structure represented in the expressions and statements of the first higher level language) can be lost.

A more specific example includes the targeting of C++ source code to other platforms such as, for example, High Level Shader Language ("HLSL") source code, for subsequent compilation. A C++ source program can be translated into a low-level intermediate representation of the source program that captures all necessary information about the C++ source program. A corresponding Control Flow Graph ("CFG") is also generated. The CFG captures control flow information from the C++ source program. Within the CFG, control is transferred between instructions (or basic blocks) using conditional and/or unconditional branch instructions (e.g., unconditional goto, conditional goto, and switch instructions).

However, a target platform may not support gotos or may have restrictions on how gotos can be used. For example, HSLS supports structured control flow constructs, such as, for example, if, else, for, while, do/while, switch, break, and continue. However, HLSL does not support goto. Further, the target platform may have a limitation on the level of nesting loops that is supported. Thus, it may be difficult to generate a source program for the target platform that is semantically equivalent to and efficiently implements a CFG.

BRIEF SUMMARY

The present invention extends to methods, systems, and computer program products reconstructing program flow control. A plurality of lower level code instructions is accessed. The lower level code instructions were translated from corresponding statements and expressions of first higher level code in a first format. The plurality of lower level code instructions represents a control flow of the first higher level code. A portion of the control flow is defined by one or more branch instructions selected from among conditional branch instructions and unconditional branch instructions.

The plurality of lower level code instructions is translated into a corresponding plurality of statements and expressions of second higher level code in a second different format. The statements and expressions of second higher level code have control flow equivalent to the control flow of the first higher level code. The translation includes identifying a plurality of basic blocks within the lower level code based on the arrangement of the one or more branch instructions within the plurality of lower level code instructions. Each basic block includes one or more instructions of the lower level code configured to execute as a group. The translation also includes defining a block guard variable for each basic block in the plurality of basic blocks. In some embodiments, a block guard variable is defined as a Boolean variable. When the value of the Boolean variable is set to TRUE the corresponding basic block is executed.

For each basic block in the plurality of basic blocks the translation includes generating statements and expressions in the second higher level format to represent the functionality expressed in the basic block. Statements and expressions in the second higher level format are also generated to represent assignment of values to a plurality of the block guard variables. The plurality of block guard variables include the block guard variable for the basic block and a block guard variable for at least one other basic block. Assignments to the plurality of block guard variables implement the control flow of the first higher level code, including the portion of the control flow defined by the one or more branch instructions.

Statements and expressions in the second higher level format are generated to represent a conditional statement. Satisfying the conditional statement is dependent on the value assigned to the block guard variable for the basic block. The functionality in the basic block and the assignment of values to the plurality of the block guard variables are nested within the conditional statement.

Statements and expressions in the second higher level format are generated to represent while statement. The condition on the while statement set to TRUE. Any conditional statements are nested within the while statement.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for reconstructing program flow control. A plurality of lower level code instructions is accessed. The lower level code instructions were translated from corresponding statements and expressions of first higher level code in a first format. The plurality of lower level code instructions represents a control flow of the first higher level code. A portion of the control flow is defined by one or more branch instructions selected from among conditional branch instructions and unconditional branch instructions.

The plurality of lower level code instructions is translated into a corresponding plurality of statements and expressions of second higher level code in a second different format. The statements and expressions of second higher level code have control flow equivalent to the flow control of the first higher level code. The translation includes identifying a plurality of basic blocks within the lower level code based on the arrangement of the one or more branch instructions within the plurality of lower level code instructions. Each basic block includes one or more instructions of the lower level code configured to execute as a group. The translation also includes defining a block guard variable for each basic block in the plurality of basic blocks. In some embodiments, a block guard variable is defined as a Boolean variable. When the value of the Boolean variable is set to TRUE the corresponding basic block is executed.

For each basic block in the plurality of basic blocks the translation includes generating statements and expressions in the second higher level format to represent the functionality expressed in the basic block. Statements and expressions in the second higher level format are also generated to represent assignment of values to a plurality of the block guard variables. The plurality of block guard variables includes the block guard variable for the basic block and a block guard variable for at least one other basic block. Assignments to the plurality of block guard variables implement the control flow of the first higher level code, including the portion of the control flow defined by the one or more branch instructions.

Statements and expressions in the second higher level format are generated to represent a conditional statement. Satisfying the conditional statement is dependent on the value assigned to the block guard variable for the basic block. The functionality in the basic block and the assignment of values to the plurality of the block guard variables are nested within the conditional statement.

Statements and expressions in the second higher level format are generated to represent a while statement. The condition on the while statement set to TRUE. Any conditional statements are nested within the while statement.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
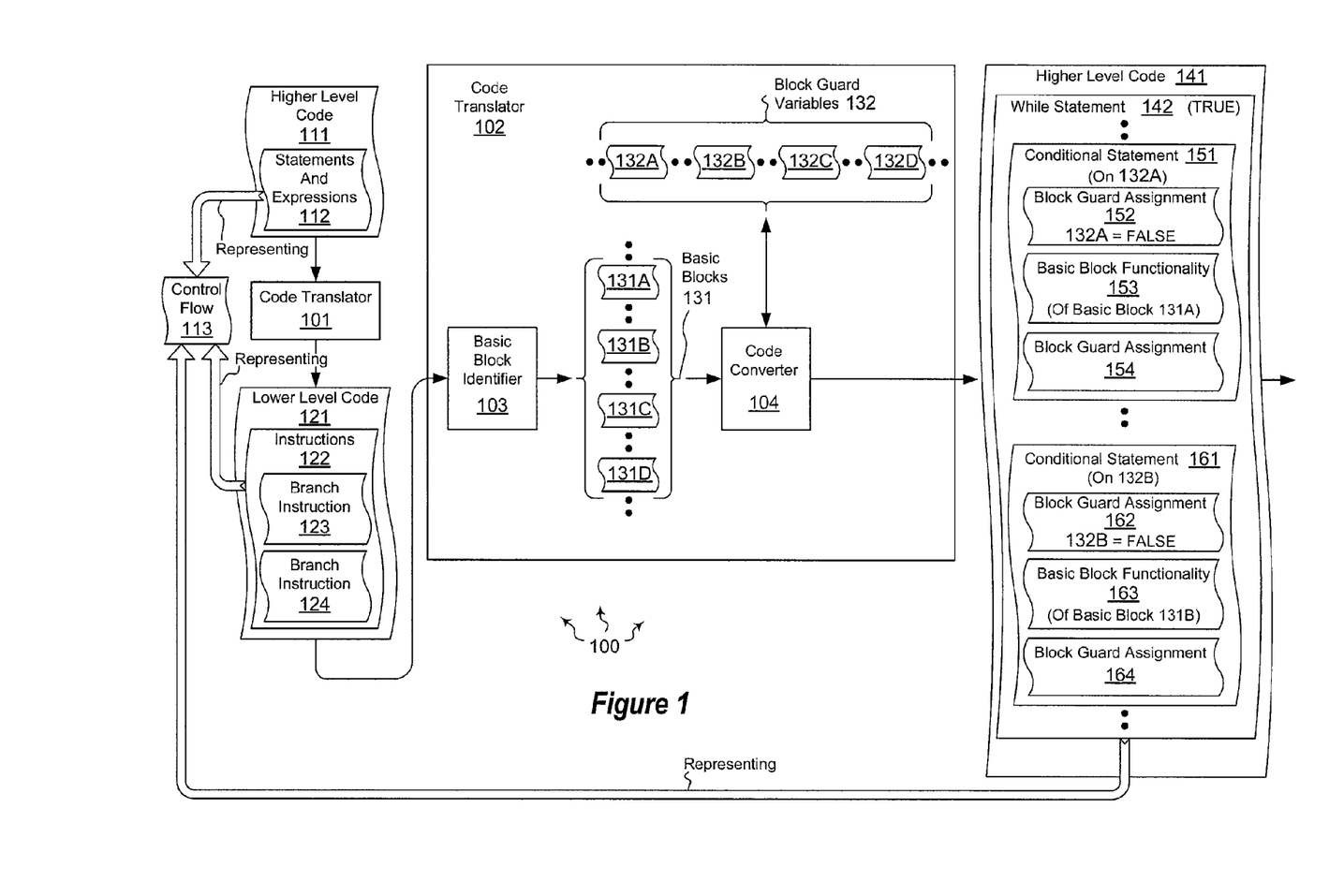
FIG. 1 illustrates an example computer architecture that facilitates reconstructing program flow control.

FIG. 1 illustrates an example computer architecture 100 that facilitates reconstructing program flow control. Referring to FIG. 1, computer architecture 100 includes code translator 101 and control translator 102. Each of the depicted components can be connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, code translator 101 is configured to translate (e.g., compile) expressions and statements of higher level code (of a first format) into instructions of lower level code. The higher level code can be in a general purpose programming language, such as, for example, C++, Visual Basic, etc. The lower level code can be an intermediate representation of the higher level code that captures appropriate information about the expressions and statements of higher level code (of the first format). A Control Flow Graph ("CFG") capturing the control flow of the expressions and statements of higher level code (of the first format) can also be generated. In general, code translator 102 is configured to translate the instructions of lower level code into expressions and states of higher level code (of a second format). The second higher level code can be in another programming language, such as, for example, High Level Shader Language ("HLSL") or DirectX ("DX").

As depicted, code translator 102 includes basic block identifier 103 and code converter 104. Basic block identifier 104 is configured to identify basic blocks within lower level instructions. A basic block is a portion of instructions that has one entry point and one exit point. That is, there no instruction within a basic that is the destination of a branch instruction, and only the last instruction of a basic block can cause execution to transfer to different basic block. As such, whenever the first instruction in a basic block is executed, the rest of the instructions are necessarily executed exactly once. Basic blocks can form the vertices or nodes in a CFG.

Code converter 104 is configured to convert basic blocks of lower level instructions into expressions and statements of higher level code (of the second format). Code converter 104 can also generate additional statements and expressions of higher level code to reconstruct control flow from lower level code. In some embodiments, the additional statements and expressions are generated to compensate for a lack of equivalent flow control constructs (e.g., conditional and/or unconditional branches) or other semantic differences in the programming language (e.g., HLSL) of the second higher level code.

The additional statements and expressions can include additional conditional and/or loop statements. Code converter 104 can also define block guard and/or loop guard variables used as conditions on entry into the additional conditional and/or loop statements. The values of block guard and/or loop guard variables can be assigned to facilitate transitions between conditional and/or loops statements respectively. Basic blocks can be nested within the additional conditional and/or loop statements. Thus, transitions between conditional and/or loops statements can be used transfer execution between basic blocks to reconstruct (preserve) control flow of the lower level code.

Figure 2:
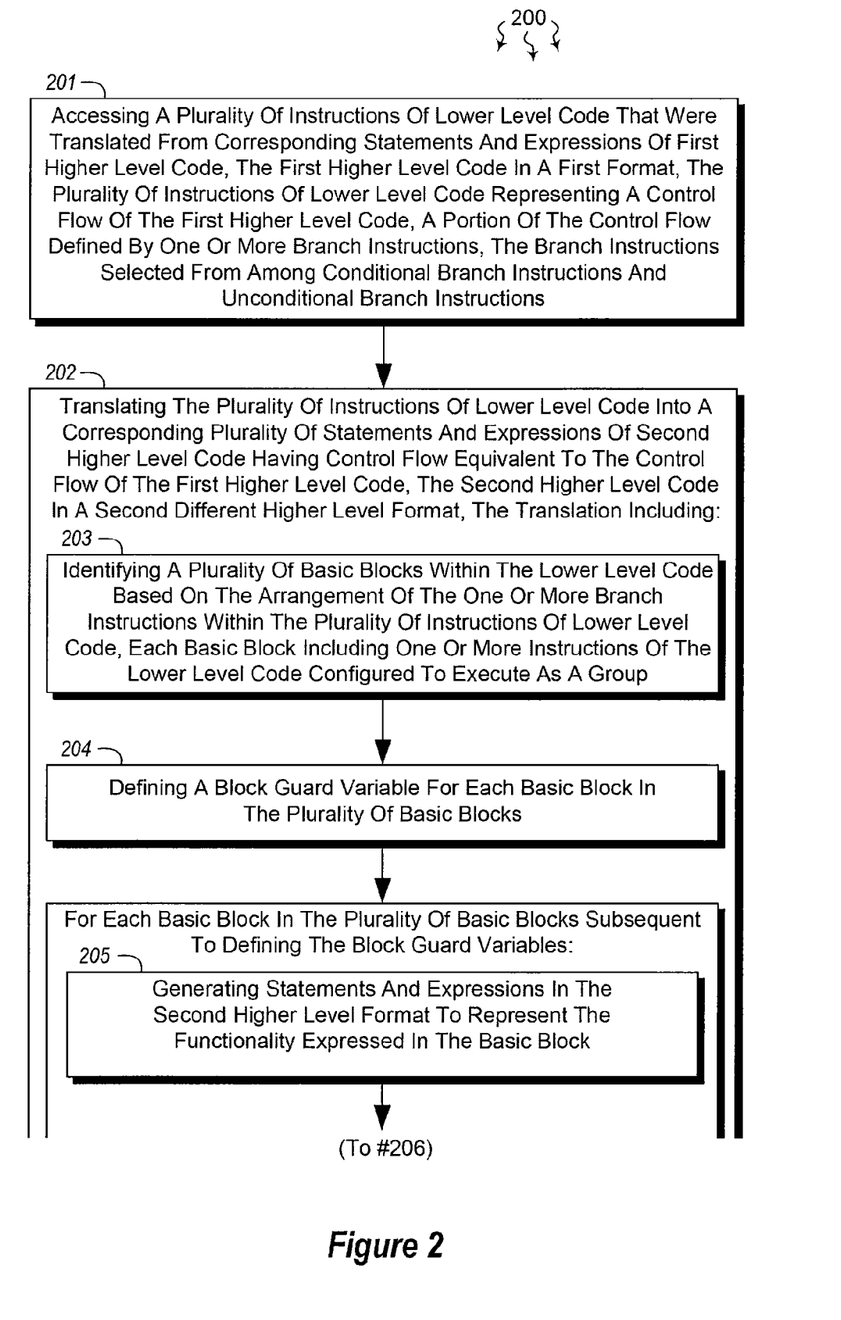
FIG. 2 illustrates a flow chart of an example method for reconstructing program flow control.

FIG. 2 illustrates a flow chart of an example method 200 for reconstructing program control flow. Method 200 will be described with respect to the components and data of computer architecture 100.

Method 200 includes an act of accessing a plurality of instructions of lower level code that were translated from corresponding statements and expressions of first higher level code, the first higher level code in a first format, the plurality of instructions of lower level code representing a control flow of the first higher level code, a portion of the control flow defined by one or more branch instructions, the branch instructions selected from among conditional branch instructions and unconditional branch instructions (act 201). For example, code translator 102 can access lower level code 121. Lower level code 121 can be previously translated from higher level code 111. For example, code translator 101 can receive higher level code 111 (e.g. C++ code) including statements and expressions 112. Code translator 101 can translate higher level code 111 into lower level code 121 including instructions 122. Thus, instructions 122 are translated from statements and expressions 112. Statements and expressions 112 and instructions 122 can both represent control flow 113. A portion of control flow 113 is defined by branch instructions 123 and 124, which can be unconditional gotos, conditional gotos, or switch operations.

Method 200 includes an act of translating the plurality of instructions of lower level code into a corresponding plurality of statements and expressions of second higher level code having control flow equivalent to the flow control of the first higher level code, the second higher level code in a second different higher level format (act 202). For example, code translator 102 can translate lower level code 121 into higher level code 141 (e.g., HLSL code). Higher level code 141 can also represent control flow 113.

Act 202 includes an act of identifying a plurality of basic blocks within the lower level code based on the arrangement of the one or more branch instructions within the plurality of instructions of lower level code, each basic block including one or more instructions of the lower level code configured to execute as a group (act 203). For example, basic block identifier 103 can identify basic blocks 131 (including basic blocks 131A, 131B, 131C, 131B, etc.) within lower level code 121 based on the arrangement of branch instructions, 123, 124, etc.

Act 202 includes an act of defining a block guard variable for each basic block in the plurality of basic blocks (act 204). For example, code converter can define block guard variables 132 (including block guard variables 132A, 132B, 132C, 132D, etc.). Each block guard variable can correspond to a basic block. For example, block guard variable 132A can correspond to basic block 131A, block guard variable 132B can correspond to basic block 131B, block guard variable 132C can correspond to basic block 131C, block guard variable 132D can correspond to basic block 131D, etc. In some embodiments, a block guard variable is defined as a Boolean variable. When the value of the Boolean variable is set to TRUE the corresponding basic block is executed. On the other hand, when the value of the Boolean variable is not set to TRUE the corresponding basic block is not executed.

For each basic block in the plurality of basic blocks subsequent to defining the block guard variables, act 202 includes an act of generating statements and expressions in the second higher level format to represent the functionality expressed in the basic block (act 205). Thus, for each basic block 131, code converter 104 can generate statements and expressions in the programming language of higher level code 141 (e.g., HLSL) to represent the functionality expressed in the basic block. For example, code converter 104 can generate basic block functionality 153 to represent the functionality expression in basic block 131. Similarly, code converter 104 can generate basic block functionality 163 to represent the functionality expression in basic block 133. Other statements and expressions can be similarly generated for other basic blocks 131. At least one basic block can be an "exit/terminate" block that includes statements and expressions for terminating execution of the second higher level code.

For each basic block in the plurality of basic blocks subsequent to defining the block guard variables, act 202 includes an act of generating statements and expressions in the second higher level format to represent assignment of values to a plurality of the block guard variables, the plurality of block guard variables including the block guard variable for the basic block and a block guard variable for at least one other basic block, assignments to the plurality of block guard variables for implementing the control flow of the first higher level code, including the portion of the control flow defined by the one or more branch instructions (act 206). Thus, for each basic block 131, code converter 104 can generate statements and expressions in the programming language of higher level code 141 (e.g., HLSL) to represent assignment of values to a plurality of the block guard variables 131. For example, code converter 104 can generate block guard assignment 152 to assign a value to block guard variable 132A (which correspond to basic block 131A) and block guard assignment 154 to assign a value to another block guard variable (which corresponds to another basic block 131). Similarly, code converter 104 can generate block guard assignment 162 to assign a value to block guard variable 132B (which correspond to basic block 131B) and block guard assignment 164 to assign a value to another block guard variable (which corresponds to another basic block 131).

For each basic block in the plurality of basic blocks subsequent to defining the block guard variables, act 202 includes an act of generating statements and expressions in the second higher level format to represent a conditional statement, satisfying the conditional statement dependent on the value assigned to the block guard variable for the basic block (act 207). Thus, for each basic block 131, code converter 104 can generate statements and expressions in the programming language of higher level code 141 (e.g., HLSL) to represent a conditional statement (e.g., an "if" statement). Satisfying the conditional statement depends on the value of the corresponding block guard variable 132.

For example, code converter 104 can generate conditional statement 151. Satisfying conditional statement 151 can depend on the value of block guard variable 132A (which corresponds to basic block 131A). For example, when block guard variable 132A is TRUE, conditional statement 151 is satisfied.

Similarly, code converter 104 can generate conditional statement 161. Satisfying conditional statement 161 can depend on the value of block guard variable 132B (which corresponds to basic block 131B). For example, when block guard variable 132B is TRUE, conditional statement 161 is satisfied.

For each basic block in the plurality of basic blocks subsequent to defining the block guard variables, act 202 includes an act of nesting the functionality expressed in the basic block and the assignment of values to the plurality of the block guard variables within the conditional statement (act 208). Thus, for each basic block 131, code converter 104 can nest the functionality expressed in the basic block and block guard assignments with a conditional statement.

For example, code converter 104 can nest block guard assignment 152, basic block functionality 153, and block guard assignment 154 in conditional statement 151. Thus, when conditional statement 151 is satisfied (e.g., when block guard variable 132A=TRUE), execution transitions to block guard assignment 152. Block guard assignment 152 is used to assign (reset) the value of block guard variable 132A to FALSE.

Similarly, code converter 104 can nest block guard assignment 162, basic block functionality 163, and block guard assignment 164 in conditional statement 161. Thus, when conditional statement 161 is satisfied (e.g., when block guard variable 132B=TRUE), execution transitions to block guard assignment 162. Block guard assignment 162 is used to assign (reset) the value of block guard variable 132B to FALSE.

Other block guard assignments and basic block functionality can be similarly nested in corresponding conditional statements.

Resetting block guard variable to FALSE upon satisfaction of a corresponding conditional statement, limits control flow to a single execution of the basic block. Further execution of the basic block can occur when other block guard assignments within other conditional statements set the value of a block guard variable to TRUE Act 202 includes an act of generating statements and expressions in the second higher level format representing a while statement, the condition on the while statement set to TRUE (act 209). Thus, code converter 104 can generate statements and expressions in the programming language of higher level code 141 (e.g., HLSL) to represent a while statement set to TRUE. For example, code converter 104 can generate while statement 142. The condition on while statement 142 can be set to TRUE. Thus, execution can continue within while statement 142 until a conditional statement permits entry into the exit/terminate block, which breaks out from the while loop and the program terminates.

Act 202 includes an act of nesting any conditional statements within the while statement (act 210). For example, code converter 104 can nest conditional statements 151, 161, etc., within while statement 142. The arrangement of while statement 142, conditional statements 151, 152, etc., and block guard assignments 152, 154, 162, 164, etc, relatively to one another reconstruct (preserve) control flow 113 within higher level code 141.

In some embodiments, C++ source code (a first higher level format) is translated into an intermediate representation IR (a lower level format). A CFG is also built. The CFG is a side-by-side data structure built from the IR and describes the control flow of the IR. The IR is then translated into HLSL source code (a second different higher level format) for compilation into HLSL bytecode (that can then be executed at a Graphical Processing Unit ("GPU")).

In these embodiments, a CFG can support:

Unconditional jumps: jump to another block.

Conditional jumps: jump to another block if and only if a Boolean variable evaluates to true.

Switch operations: depending on the value of an integer variable, the program jumps to one of a given list of target basic blocks. If the numerical value of the variable is different than all of the enumerated options then control transfers to a "default" basic block. All of the target blocks then contain at the end of the bodies an unconditional jump to a continuation "join" block.

On the other hand, HLSL source code can represent the following types of structured flow control: if/else statements, switch statements, and do-while/while/for statements, including "break" and "continue". Further, HLSL does not obey C++ short-circuit evaluation semantics. Thus, a CFG cannot natively be reconstructed into the original C++ expressions, which are then directly mapped to HLSL expressions, since these expressions have different semantics between C++ and HLSL. Accordingly, introduced control flow can be used to compensate for the differences in supported structured flow control and shortcut evaluation rules.

Introduced control flow can be used to compensate in CFGs without loops. For loop-free CFGs a Boolean variable can be defined for each basic block. When basic blocks are emitted, the translation includes an "if" block that is guarded by its associated Boolean condition variable. Thus, in order to jump from block i to block j (where i must be smaller than i), block i sets j's condition variable to true. In order to fall-through from block i to block i+1, block i sets the condition variable controlling block i+1. As such, there is little, if any, difference between "falling through" and "jumping" in the generated code.

For example, for the loop-free source code:

```
if ( a || (b && c) || d) { <if-body> } else { <else-body> }
```

A CFG similar to the following can be generated:

```
L0:    if  (a)  goto L7;
L1:    if  (b)  goto L3;
L2:             goto L4;
L3:    if  (c)  goto L7;
L4:    if  (d)  goto L7;
L5:    <else-body>
L6:             goto end;
L7:    <if-body>
End:
```

Introduced flow control can then be added to generate code equivalent to:

```
Bool c0 = c1 = c2 = c3 = c4 = c5 = c6 = false;
L0: if (c0) { if (a) {c7=true;} else {c1=true;} }
L1: if (c1) { if (b) {c3=true;} else {c2=true;} }
L2: if (c2) {        c4=true;                   }
L3: if (c3) { if (c) {c7=true;} else {c4=true;} }
L4: if (c4) { if (d) {c7=true;} else {c5=true;} }
L5: if (c5) { <else-body> }
L6: if (c6) { }
L7: if (c7) { <if-body> }
End:
```

As depicted, the generated equivalent code does not include any goto's. They functionality of the gotos is represented by setting and checking condition variables.

Introduced control flow can also be used to compensate in CFGs with loops. For example, all basic blocks within a CFG can be nested within an outer loop. Jumping from one block to another can be simulated by "falling-through" each intervening block, including ones that occur when going around the loop. Upon entry to a block, the condition variable for the block is disabled, to prevent it from being executed when the generated loop is re-executed.

Similar to loop-free source code, to simulate jumping or proceeding to a target block, a source block sets the corresponding condition variable to true. To exit the program, a terminal block can break out of the loop. Alternately, a condition variable can be used to control the exit of the emitted loop. The condition variable guarding the generated outer loop is initialized to TRUE and set to FALSE to exit the program.

The transformation essentially flattens the program into a single loop. Obviously, when the source program contains a nested loop structure this mapping is not very efficient, as inner tight loop iterations are implemented by going through all blocks in the program, skipping the striking majority of them in the process (but not before incurring the cost of evaluating their conditions as FALSE).

For example, for the source code (herein after labeled the example original program):

```
for (int i=0; i<100; i++) {
    for (int j=0; j<200; j++) {
        x++;
    }
}
//end
```

Low level IRsimilar to the following can be generated (hereinafter labeled the exampleIR):

```
B1:     i=0
B2:     if i>=100 goto B7
B3:     j=0
B4:     if j>=200 goto B6
B5:     x++
        j++
        goto B4
B6:     i++
        goto B2
B7:     // end
```

Introduced flow control can then be added to generate code equivalent to:

```
c1 = true; c2 = c3 = c4 = c5 = c6 = c7 = false;
while (true) {
/*B1*/ if (c1) {
    c1=false;
    i=0;
    c2=true; }
/*B2*/ if (c2) {
    c2=false;
    if (i>=100){c7=true;}
    else {c3=true;} }
/*B3*/ if (c3) {
    c3=false;
    j=0;
    c4=true; }
/*B4*/ if (c4) {
    c4=false;
    if (j>=200){c6=true;}
    else {c5=true;} }
/*B5*/ if (c5) {
    c5=false;
    x++;
    j++;
    c4=true; }
/*B6*/ if (c6) {
    c6=false;
    i++;
    c2=true; }
/*B7*/ if (c7) {
    c7=false;
    break; }
}// while loop
```

Various optimizations can also be implemented when reconstructing (preserving) control flow. Generally, for any sequence of blocks in a CFG <$B_1, \ldots B_n$> blocks can be assigned into an arbitrary loop tree where each loop can contain an arbitrary number of basic blocks and other nested loops. For example:

Loop 1
    B2
    Loop 2
      Loop 5
        B7
      Loop 3
        B1
        B5
      B3
      Loop 4
        B4
        B6

Is a representation of the basic block structure of the example IR. The representation simulates the example IR logic using additional transformations. In addition to the block guards, each loop has its own loop guard. Loop guards are disabled when a loop is entered. To jump into one block from another the loop guards of levels in the tree which need to be entered or re-entered are enabled. For example, to jump from $B_5$ to $B_7$, loop 3 has to be exited, then loop 1 has to be re-entered, then loop 2 and loop 5 are entered. Thus, to jump from $B_5$ to $B_7$ the conditions for loops 1, and 5 are set, as well as the condition for block 7.

Figure 3:
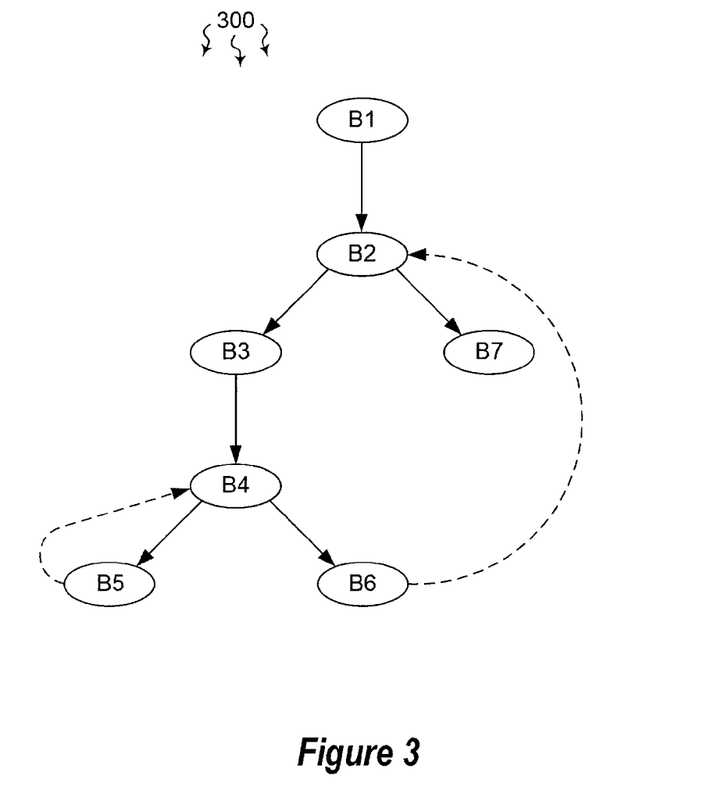
FIG. 3 illustrates an example dominance graph.

In some embodiments, a dominance tree is formulated for a CFG for use with additional optimizations (e.g., loop reconstruction algorithms). A dominance tree is tree where each node's (basic block's) children are those nodes (basic blocks) it immediately dominates. One node (basic block) dominates another node (basic block) if every path from a start node (basic block) to the other node (basic block) goes through the node (basic block). Immediate domination is defined as: for node a !=b, a idom b if and only if a dom b and there does not exist a node c such that c !=a and c!=b for which a dom c and c dom b. For example, FIG. 3 illustrates a the dominance tree 300 for the example IR, where the solid directed lines capture the domination relationship and the dash lines capture control flow arcs which do not correspond to arcs in the domination tree. Thus, for example, B4 immediately dominates B6, B1 dominates all the nodes in the tree, and B6 has a jump arc into B2.

Based on the dominance tree and the jump arcs present in the graph, a loop can be introduced for each node (basic block) in the dominance tree (thus, each loop contains one block, and then one nested loop for each child block in the dominance tree). By definition, any path through any node in the loop L passes through the basic block for which it was introduced (because that node dominates the sub-tree contained in the loop). As such, the block conditions become redundant.

Based on the domination tree, introduced flow control can then be added to generate code equivalent to:

```
loop1 = true;
while (loop1) {
    loop1 = false;
    /*B1*/      {
        i=0;
        loop2 = true;
    }
    while (loop2) {
        loop2 = false;
        /*B2*/      {
            if (i>=100) {loop7=true;}
            else {loop3=true;}
        }
        while (loop3) {
            loop3 = false;
            /*B3*/      {
                j=0;
                loop4 = true;
            }
            while (loop4) {
                loop4 = false;
                /*B4*/      {
                    if (j>=200){loop6=true;}
                    else {loop5=true;}
                }
                while (loop5) {
                    loop5 = false;
                    /*B5*/      {
                        x++;
                        j++;
                        loop4=true;
                    }
                } // 15
                while (loop6) {
```

-continued

```
            loop6 = false;
            /*B6*/          {
                i++;
                loop2=true;
            }
        } // loop6
      } // loop4
    } // loop3
    while (loop7) {
        loop7 = false;
        /*B7*/        { }
    } // loop7
  } // loop2
} // loop1
```

As depicted, the code based on the dominance tree has improved locality properties. The improved locality properties allow dynamically spending time in the sections corresponding to B4 and B5 (the intent in the original program).

Within the generated code, some loops have a single point which sets their conditions to true. These loops can be fully inlined at the place that sets the condition, and the condition can be totally removed. With continuing reference to the same example, basic blocks 1, 3, 5, 6 and 7 have a single point which sets their conditions to true. After inlining, introduced flow control can then be added to generate code equivalent to:

```
{ // loop1 (special case)
    /*B1*/ {
        i=0;
        loop2 = true;
    } // B1
    while (loop2) {
        loop2 = false;
        /*B2*/   {
            if (i>=100){
                /*B7*/
                } // B7
            } // loop7 (inlined)
            else {
                /*B3*/ {
                    j=0;
                    loop4 = true;
                } // B3
                while (loop4) {
                    loop4 = false;
                    /*B4*/      {
                        if (j>=200){
                            /*B6*/          {
                                i++;
                                loop2=true;
                            } // B6
                        } // loop6 (inlined)
                        else {
                            /*B5*/          {
                                x++;
                                j++;
                                loop4=true;
                            } // B5
                        } // loop5 (inlined)
                    } // B4
                } // loop4
            } // loop3 (inlined)
        } // B2
    } // loop2
} // loop1 (inlined)
```

As depicted, the generated code is closer to the example original program. The generated code contains two nested loops like the example original program and the logic is similar. Further optimizations can also be applied. "while" loops can be turned into "do-while" loops. When an enabling condition for a loop dominates the loop body, the enablement can be removed, and the loop turned into a do-while loop. "while" loops can be turned into "if" statements. If no where inside a loop body the loop condition for the loop body is set, the loop can be turned into an "if" statement.

After turning loops into do while loops, introduced flow control can then be added to generate code equivalent to (there is no occurrence of failing to set a loop condition for a loop within the loop) the following:

```
i=0;
do {
    loop2 = false;
    if (i>=100){ }
    else {
        j=0;
        do {
            loop4 = false;
            if (j>=200){
                i++;
                loop2=true;
            }
            else {
                x++;
                j++;
                loop4=true;
            }
        } while (loop4);
    }
} while (loop2);
```

Within the example original program, the relationship between an enabling site and a loop can be one of at least two cases: (a) the enabling site corresponds to a fall-through to the next block, or, (b) the enabling site corresponds to a jump. In the case that the enabling site is a jump, the inlining of the loop at the location of the enablement of the loop results in a re-ordering of the code that originates from different basic blocks. For example, in the last generated code sample depicted above, the body of basic blocks 7 and 6 occurs before the body of basic block number 5. In some cases this may be undesirable. As such, inlining can be implemented for those cases that the enabling site is unique and that the enabling site represents a fall-through in the original CFG. However, inlining is not implemented for jumps. Thus, blocks numbers 7 and 6 would not have been inlined.

Without inlining blocks 6 and 7, introduced flow control can then be added to generate code equivalent to:

```
i=0;
do {
    loop2 = false;
    if (i>=100){
        loop7 = true;
    }
    else {
        j=0;
        do {
            loop4 = false;
            if (j>=200){
                loop6 = true;
            }
            else {
                x++;
                j++;
                loop4=true;
            }
            if (loop6){
                loop6 = false;
                i++;
                loop2=true;
```

-continued

```
        }
    } while (loop4);
    }
} while (loop2);
if (loop7) {
    loop7 = false;
}
```

As described loop nesting can result in situations like the above generated code where block 6 is nested under the loop of block 4. If block 6 is fully inlined, then there is no runtime cost involved in this nesting decision. However, if block 6 is not inlined, then it occurs inside 4's loop while the original loop contained just blocks 4 and 5, and didn't contain 6. The fact that block 6 is now included in block 4 represents an additional runtime cost (when 6 is not fully inlined at its enabling site).

In order to mitigate this problem, adjacent domination nesting can be used. In adjacent domination nesting, if A's loop nests B's loop, then A does in-fact dominate B. However the converse is not necessarily true: if B is dominated by A, then we have the option of either nesting its loop under A's, or "pulling it up" and making it a sibling of A. In other words A nests B implies A dominates B, but A dominates B doesn't imply that A nests B.

"Pulling loops up" can be used to keep inner loops tight. For example, if A immediately dominates B but there exists a block, in the loop tree, between A and B which jumps back to A, then B will be "pulled up". The process can be repeated until B doesn't interfere in any loops, or until B is pulled all the way to the top-most loop.

Nesting can be represented through a formal abstraction, hereinafter referred to as General Nesting Trees ("GNT's). For a nesting tree, the tree can have three types of nodes:
1. Loops. Loops contain basic blocks and other loops. Some loops can be optimized.
2. Basic blocks. A basic block represents (implicitly) a basic block body of code and (explicitly) jump sites. Therefore the children of basic blocks can be only jump node (three types, see below).
3. Jump sites are either fall-through or jumps or inline site.
   a. A fall-through node represents a fall-through control between adjacent blocks in, the original CFG. It identifies a destination basic block.
   b. A jump node represents a jump in the original CFG. It identifies a destination basic block
   c. An inline site contains a single loop which contains a single basic block. An inline site represent a jump or a fall-through which has been turned into an inlining of the block at the location where the jump would have occurred.

Basic blocks can be moved around, and loops introduced and deleted freely, and still the GNT represents the same source CFG. However, turning a jump or a fall-through to a block B contained in the loop L (i.e., B is nested under L in a GNT) into an inline node containing L is permissible when:
1. The jump or fall-through was the only location which transferred control into B-AND-
2. B dominates all the other blocks within L (again, in the tree sense that B dominates in the original CFG all basic blocks which happen to occur under L in the GNT).

Another option for inlining will add a loop L around B, containing just B, such that the above is true and the new L and B within it are inlined at the jump site to B. The notation L, can be used to denote a loop for block$_i$, B$_i$ can be used to denote the basic block i, and a J can be used to denote a jump site following by the jump type (F=fall-through, J=jump, I=inline site).

This formulation can be used to represent the original nesting tree:

Loops having a single enabling site, where the site represents a fall-through (i.e., blocks 2, 3 and 5) can be inlined. B2, B3 and B5 dominate the respective loops they reside within (L2, L3 and L5). The following tree results from inlining B2, B3, and B5:

Subsequently, any loops which have their condition set in a manner which "jumps over" some remaining blocks in the loop are identified. This can proceed from inner loops to outer loops. Loop L4 contains a jump to B4 from B5. This jump bypasses L6 and L6 can be pulled out such that it becomes a sibling of L4. The following tree results from pulling out L6:

-continued

Loop 4 is now more compact. The only other loop which is not degenerate is Loop 2 which is also not compact. That is, the node in the tree which "jumps" back to B2 is B6, which then bypasses its sibling L7 B2. Again, in order to make L2 more compact we pull L7 up one level, and now all true loops (L2 and L4) are compact:

Based on the above loop representation, it is reasonably simple to detect which loops can be replaced by an "if" and which loops and blocks do not require a condition to be evaluated. This information can be derived from one or more of the following three node (basic block) properties.

(1) Loop L in a GNT is jumping back if there exists a simulated jump from a basic block A within L to a basic block B within L where B precedes A in the depth-first tree traversal order of the GNT.

(2) A loop or a basic block N, in a GNT is being jumped around if it is the ith immediate child of loop $L_p$ and there exists a loop or a basic block node $N_j$ which is also an immediate child of $L_p$ where j>i and there exists at least one simulated branch to $N_j$ (in the case $N_j$ is a block) or into $N_J$ (in the case $N_J$ is a loop) emanating from block N which is either:

1. A descendant of $L_p$ which precedes N, in the tree order - OR -

2. Residing outside of $L_p$ (this case represents the relatively rare case of a jump into a middle of a loop).

(3) A loop L in an adjacent dominance nesting ("ADN") breaks out if there exists a simulated jump occurring from a basic block nested underneath L to a basic block nested not underneath L.

The following algorithm calculates these properties for each block and loop in a GNT:

1. For each jump or fall-through node J in the ADN perform:

a. Let $B_i$ be the source block and $B_j$ be the destination block b. Let $L_c$ be the lowest-most common ancestor node of type loop of both $B_i$ and $B_j$. The lowest most common ancestor of $B_i$ and $B_j$ can be a loop. Structurally, another option is that $B_i$ and $B_j$ are nested under a different block $B_e$.

c. Let $N_i$ and $N_j$ be the immediate children of $L_c$ which are either $B_i$ or $B_j$ or contain $B_i$ and $B_j$, respectively.

d. If $N_i$ occurs after $N_j$ in $L_c$ then mark $L_c$ as "jumps back".

e. For each loop node L in the ancestry chain between $N_i$ and $B_i$ (this can be an empty set), mark the loop L as "breaks out".

f. Consider the list of immediate children of $L_c$ starting from N, (not including $N_i$) and arriving at $N_j$ (not including $N_j$), if necessary going around the loop in a cyclic fashion. Each such child node (which must be either a basic block or a loop) is marked "being jumped around"

i. As long as Nj is not the target basic block Bj, descend down the ancestry chain from Nj to its child T which contains (immediately or indirectly) $B_j$ and mark all of T's children which occur before the next ancestor of $B_j$ as being "jumped around".

ii. Going from B, up towards $N_i$, mark all siblings of Bi that follow it within its loops as being jumped around, and then proceed to B, parent and repeat, until $N_i$ is reached.

Step f can be further represented by the following pseudocode:

```
Procedure Mark-Being-Jumped-Around-Down(Node Nj, BasicBlock Bj)
    If Nj is not Bj
        foreach child T of Nj
            if (T is ancestor of Bj OR T is Bj) then
                call Mark-Being-JumpedAround(T, Bj)
                return;
            else
                mark T as "being jumped around"
            end if
        end foreach
    end if
end procedure
Procedure Mark-Being-Jumped-Around-Up(Node Nj, BasicBlock Bj)
    If Nj is not Bj
        foreach sibling T of Bj which follows Bj
            mark T as "being jumped around"
        end if
        call Mark-Being-Jumped-Around-Up(Nj, Parent(Bj))
end procedure
```

When calculating the three different properties of a loop and the single block property separately their combinations can be considered when generating the code for loops. Table 1 represents some example combinations.

| Case # | Loop jumps back | Loop being Jumped around | Loop breaks out | Generated loop code |
|---|---|---|---|---|
| 1 | Yes | Yes | Yes | while (cond) {<br>    cond=false;<br>    <loop-body> } |
| 2 | Yes | Yes | No | if (cond)<br>    while (true)<br>        <loop-body> |
| 3 | Yes | No | Yes | do {<br>    cond = false;<br>    <loop-body><br>} while (cond) |
| 4 | Yes | No | No | while (true)<br>    <loop-body> |
| 5 | No | Yes | Yes | if (cond) {<br>    cond=false;<br>    <loop-body> } |
| 6 | No | Yes | No | If (cond)<br>    <loop-body> |
| 7 | No | No | Don't care | <loop-body> |

As represented, the code generated for blocks depends on the block property "being jumped around". If set to true, then the block's body is being encased in an "if" dependent on the condition's value. If set to false, no condition checking is necessary and the condition variable is eliminated. Within this context, jump generation can be described as follows:

1. Consider a jump or a fall-through from $B_i$ to $B_j$.
2. Let $L_c$ be the lowest common ancestor node of $B_i$ and $B_j$. ($L_c$ must be a loop).
3. Consider the ancestry chain starting from $L_c$ (but not including $L_c$) and arriving at $B_j$ (including $B_a$). The ancestry chain must be comprised of a possibly empty prefix of loops, terminating in a single basic block, which is $B_j$. The condition for each target loop and block are set if they haven't been elided by the target. Specifically:
   a. For loops, cases 1, 2, 5 and 6 from Table 1 include setting the conditions.
   b. For the target basic block, the condition is set if and only if the property "being-jumped-around" of the target block is set to true.

When generating loops, embodiments of the invention can comply with nesting level limits of a target source language. For any generated code introducing flow control, a further transformation can be applied to remove inner loops from within their ancestor loops for compliance. For example, for the code

```
L1
    // Nodes (1) ...
    L2
        // Nodes (2) ...
        // Nodes (3) ...
```

Suppose further that L1 and L2 are residing in a middle of a deep loop nest. To reduce the number of loops, loop L1 can be re-written as follows:

```
L1
    B1 // empty
    // Nodes (1) ...
    B2
        JJ B3
        // Nodes (3) ...
```

Where B3 is residing within the re-written loop L2 which becomes:

```
L2
    B3 // empty
    // Nodes (2) ...
    B4
        JJ B1
```

As such, L2 is essentially outlined from within L1. Jump targets are created within the two loops such that control transfer is simulated between them as if L2 is contained in L1. Subsequently, L2 is pulled to the top of the tree, and thus the top level loop for the program becomes non-redundant. This process can be repeated until loops become flat enough to comply with a target restriction.

Accordingly, embodiments including implementing or morphing a CFG into an arbitrary loop structure to reconstruct (preserve) control flow from original source code. Loop structures can be optimized and can adhere to target platform constraints. A framework can be used to recover (preserve) structured control flow in intermediate code representations. The framework supports arbitrary nesting strategies, for example, based on domination and intrinsic loop structure that assist in sufficient control flow recovery. Code can be generated out of any structurally valid GNT, including trees which represent arbitrary original control flow and arbitrary GNT derivations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for reconstructing control flow for higher level code from the contents of lower level code, the method comprising:

an act of accessing a plurality of instructions of lower level code that were translated from corresponding statements and expressions of first higher level code, the first higher level code in a first format, the plurality of instructions of lower level code representing a control flow of the first higher level code, a portion of the control flow defined by one or more branch instructions, the branch instructions selected from among conditional branch instructions and unconditional branch instructions; and an act of translating the plurality of instructions of lower level code into a corresponding plurality of statements and expressions of second higher level code that have control flow equivalent to the control flow of the first higher level code, the second higher level code in a second different higher level format, the translation including:

an act of identifying a plurality of basic blocks within the lower level code based on the arrangement of the one or more branch instructions within the plurality of instructions of lower level code, each basic block including one or more instructions of the lower level code configured to execute as a group;

an act of defining a block guard variable for each basic block in the plurality of basic blocks;

for each basic block in the plurality of basic blocks subsequent to defining the block guard variables:

an act of generating statements and expressions in the second higher level format to represent the functionality expressed in the basic block;

an act of generating statements and expressions in the second higher level format to represent assignment of values to a plurality of the block guard variables, the plurality of block guard variables including the block guard variable for the basic block and a block guard variable for at least one other basic block, assignments to the plurality of block guard variables for implementing the control flow of the first higher level code, including the portion of the control flow defined by the one or more branch instructions;

an act of generating statements and expressions in the second higher level format to represent a conditional statement, satisfying the conditional statement dependent on the value assigned to the block guard variable for the basic block; and an act of nesting the functionality expressed in the basic block and the assignment of values to the plurality of the block guard variables within the conditional statement;

an act of generating statements and expressions in the second higher level format representing a while statement, the condition on the while statement set to TRUE; and an act of nesting any conditional statements within the while statement.

2. The method as recited in claim 1, wherein the act of accessing a plurality of instructions of lower level code that were translated from corresponding statements and expressions of first higher level code comprises an act of accessing control flow graph ("CFG") that was translated from the C++ source code.

3. The method as recited in claim 1, wherein the act of translating the plurality of instructions of lower level code into a corresponding plurality of statements and expressions of second higher level code comprises an act of translating the plurality of instructions of lower level code into source code, the source code compilable into an executable program for running on a graphical processing unit ("GPU").

4. The method as recited in claim 1, wherein the act of translating the plurality of instructions of lower level code into a corresponding plurality of statements and expressions of second higher level code comprises an act of a translating a control flow graph ("CFG") into High Level Shader Language ("HLSL") source code.

5. The method as recited in claim 1, further comprising:
an act of generating statements and expressions in the second higher level format to represent one or more additional loops;
an act of defining a loop guard variable for each of the one or more additional loops, satisfying a conditional statement for the loop dependent on the value assigned to the loop guard variable for the loop;
an act of generating statements and expressions in the second higher level format to represent assignment of values to a plurality of the block guard variables;
an act of nesting the assignment of values to each of the pluralist of block guard variables within a first one or more of the conditional statements as appropriate to reconstruct the control flow of the first higher level code;

an act of nesting a second one or more conditional statements within each of the one or more additional loops as appropriate to reconstruct the control flow of the first higher level code; and an act of nesting the one or more addition loops in the while statement.

6. The method as recited in claim 5, further comprising an act of converting statements and expressions representing at least one of one or more additional loops into statements and expressions representing a do-while loop.

7. The method as recited in claim 5, further comprising an act of converting statements and expressions representing at least one of one or more additional loops into statements and expressions representing an "if" statement.

8. The method as recited in claim 1, wherein the act of translating the plurality of instructions of lower level code into a corresponding plurality of statements and expressions of second higher level code further comprises an act of inlining at least one basic block.

9. The method as recited in claim 1, wherein the act of translating the plurality of instructions of lower level code into a corresponding plurality of statements and expressions of second higher level code comprises an act of generating a dominance tree for the plurality of basic blocks.

10. The method as recited in claim 1, wherein an act of translating the plurality of instructions of lower level code into a corresponding plurality of statements and expressions of second higher level code comprises an act translating the plurality of instructions of lower level code into a corresponding plurality of statements and expressions of second higher level code that comply with a maximum nesting level for the second higher level format.

11. A computer program product for use at a computer system, the computer program product for implementing a method for reconstructing control flow for higher level code from the contents of lower level code, the computer program product comprising one or more non-volatile computer storage devices having stored thereon computer-executable instructions that, when executed at a processor, cause the computer system to perform the method, including the following:

access a plurality of instructions of lower level code that were translated from corresponding statements and expressions of first higher level code, the first higher level code in a first format, the plurality of instructions of lower level code representing a control flow of the first higher level code, a portion of the control flow defined by one or more branch instructions, the branch instructions selected from among conditional branch instructions and unconditional branch instructions; and translate the plurality of instructions of lower level code into a corresponding plurality of statements and expressions of second higher level code that have control flow equivalent to the control flow of the first higher level code, the second higher level code in a second different higher level format, the translation including the following:

identify a plurality of basic blocks within the lower level code based on the arrangement of the one or more branch instructions within the plurality of instructions of lower level code, each basic block including one or more instructions of the lower level code configured to execute as a group;

define a block guard variable for each basic block in the plurality of basic blocks;

for each basic block in the plurality of basic blocks subsequent to defining the block guard variables:
generate statements and expressions in the second higher level format to represent the functionality expressed in the basic block;
generate statements and expressions in the second higher level format to represent assignment of values to a plurality of the block guard variables, the plurality of block guard variables including the block guard variable for the basic block and a block guard variable for at least one other basic block, assignments to the plurality of block guard variables for implementing the control flow of the first higher level code, including the portion of the control flow defined by the one or more branch instructions;
generate statements and expressions in the second higher level format to represent a conditional statement, satisfying the conditional statement dependent on the value assigned to the block guard variable for the basic block; and
nest the functionality expressed in the basic block and the assignment of values to the plurality of the block guard variables within the conditional statement;
generate statements and expressions in the second higher level format representing a while statement, the condition on the while statement set to TRUE; and
nest any conditional statements within the while statement.

12. The computer program product as recited in claim 11, wherein computer-executable instructions that, when executed, cause the computer system to access a plurality of instructions of lower level code that were translated from corresponding statements and expressions of first higher level code comprise computer-executable instructions that, when executed, cause the computer system to accessing control flow graph ("CFG") that was translated from the C++ source code.

13. The computer program product as recited in claim 11, wherein computer-executable instructions that, when executed, cause the computer system to translate the plurality of instructions of lower level code into a corresponding plurality of statements and expressions of second higher level code comprises computer-executable instructions that, when executed, cause the computer system to translate the plurality of instructions of lower level code into source code, the source code compilable into an executable program for running on a graphical processing unit ("GPU").

14. The computer program product as recited in claim 11, wherein computer-executable instructions that, when executed, cause the computer system to translate the plurality of instructions of lower level code into a corresponding plurality of statements and expressions of second higher level code comprises computer-executable instructions that, when executed, cause the computer system to translate a control flow graph ("CFG") into High Level Shader Language ("HLSL") source code.

15. The computer program product as recited in claim 11, further comprising computer-executable instructions that, when executed, cause the computer system to:
generate statements and expressions in the second higher level format to represent one or more additional loops;
define a loop guard variable for each of the one or more additional loops, satisfying a conditional statement for the loop dependent on the value assigned to the loop guard variable for the loop;
generate statements and expressions in the second higher level format to represent assignment of values to a plurality of the block guard variables;
nest the assignment of values to each of the pluralist of block guard variables within a first one or more of the conditional statements as appropriate to reconstruct the control flow of the first higher level code;
nest a second one or more conditional statements within each of the one or more additional loops as appropriate to reconstruct the control flow of the first higher level code; and
nesting the one or more addition loops in the while statement.

16. The computer program product as recited in claim 11, further comprising computer-executable instructions that, when executed, cause the computer system to convert statements and expressions representing at least one of one or more additional loops into statements and expressions representing a do-while loop.

17. The computer program product as recited in claim 11, further comprising computer-executable instructions that, when executed, cause the computer system to convert statements and expressions representing at least one of one or more additional loops into statements and expressions representing an "if" statement.

18. The computer program product as recited in claim 11, wherein computer-executable instructions that, when executed, cause the computer system to translate the plurality of instructions of lower level code into a corresponding plurality of statements and expressions of second higher level code further comprise computer-executable instructions that, when executed, cause the computer system to inline at least one basic block.

19. The computer program product as recited in claim 11, wherein computer-executable instructions that, when executed, cause the computer system to translate the plurality of instructions of lower level code into a corresponding plurality of statements and expressions of second higher level code further comprises computer-executable instructions that, when executed, cause the computer system to translate the plurality of instructions of lower level code into a corresponding plurality of statements and expressions of second higher level code that comply with a maximum nesting level for the second higher level format.

20. At a computer system including one or more processors and system memory, a method for reconstructing control flow for higher level code from the contents of lower level code, the method comprising:
an act of accessing a control flow graph ("CFG") that was translated from C++ source code program, the CFG representing the control flow of the C++ source code program, a portion of the control flow in the CFG defined by one or more branch instructions, the branch instructions selected from among conditional branch instructions and unconditional branch instructions; and
an act of translating the CFG into High Level Shader Language ("HLSL") source code program that has control flow equivalent to the control flow of the C++ source code program, the translation including:
an act of identifying a plurality of basic blocks within CFG based on the arrangement of the one or more branch instructions within the CFG, each basic block including one or more lower level instructions configured to execute as a group;
an act of defining a block guard variable for each basic block in the plurality of basic blocks;
for each basic block in the plurality of basic blocks subsequent to defining the block guard variables:
an act of generating HLSL source code to represent the functionality expressed in the basic block;

an act of generating HLSL source code to represent assignment of values to a plurality of the block guard variables, the plurality of block guard variables including the block guard variable for the basic block and a block guard variable for at least one other basic block, assignments to the plurality of block guard variables for implementing the control flow of the C++ source code, including the portion of the control flow in defined by the one or more branch instructions;

an act of generating HLSL source code to represent a conditional statement, satisfying the conditional statement dependent on the value assigned to the block guard variable for the basic block; and an act of nesting the functionality expressed in the basic block and the assignment of values to the plurality of the block guard variables within the conditional statement;

an act of generating HLSL source code representing a while statement, the condition on the while statement set to TRUE; and an act of nesting any conditional statements within the while statement.

* * * * *